(12) United States Patent
Depondt (10) Patent No.: US 9,884,612 B2
(45) Date of Patent: Feb. 6, 2018

(54) WIPER BLADE DEVICE (71) Applicant: Robert Bosch Gmbh, Stuttgart (DE)

(72) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/369,801

(22) PCT Filed: Dec. 13, 2012

(86) PCT No.: PCT/EP2012/075324
§ 371 (c)(1),
(2) Date: Jun. 30, 2014

(87) PCT Pub. No.: WO2013/098081
PCT Pub. Date: Jul. 4, 2013

(65) Prior Publication Data
US 2014/0352098 A1 Dec. 4, 2014

(30) Foreign Application Priority Data
Dec. 29, 2011 (DE) .................. 10 2011 090 100

(51) Int. Cl.
B60S 1/40 (2006.01)
B60S 1/38 (2006.01)

(52) U.S. Cl.
CPC ............. *B60S 1/3879* (2013.01); *B60S 1/387* (2013.01); *B60S 1/3849* (2013.01); *B60S 1/40* (2013.01); *B60S 1/4045* (2013.01); *B60S 2001/3836* (2013.01); *Y10T 403/7094* (2015.01)

(58) Field of Classification Search
CPC .... B60S 1/3849; B60S 1/3851; B60S 1/3853; B60S 1/3856; B60S 1/40; B60S 1/4045; B60S 1/3858; B60S 1/4041; Y10T 4003/7094

USPC ............ 15/250.32, 250.451, 250.44
See application file for complete search history.

(56) References Cited

U.S. PATENT DOCUMENTS 2,667,657 A * 2/1954 Sivacek .................. B60S 1/38
15/250.33
2,751,619 A * 6/1956 Chambers ............. B60S 1/3801
15/250.44
2,767,419 A * 10/1956 Horton .................. B60S 1/3801
15/250.451

(Continued)

FOREIGN PATENT DOCUMENTS

CN 101351368 1/2009
DE 19731683 1/1999
(Continued)

OTHER PUBLICATIONS

International Search Report for Application No. PCT/EP2012/075324 dated Feb. 5, 2013 (English Translation, 2 pages).

*Primary Examiner* — Gary Graham
(74) *Attorney, Agent, or Firm* — Michael Best & Friedrich LLP (57) ABSTRACT

The invention relates to a wiper blade device comprising a main unit (10) and an adapter unit (14) which can be connected to a wiper arm (12) and is secured in a form-locked manner to the main unit (10) in at least one mounted state. The wiper blade device comprises at least one form-lock recess (16) that extends at least from a first face (18) to a second face (20) of the main unit (10) or the adapter unit (14).

23 Claims, 5 Drawing Sheets (56) References Cited

U.S. PATENT DOCUMENTS

| | | | | |
|---|---|---|---|---|
| 3,147,507 A * | 9/1964 | Glynn | ............... | B60S 1/4038 |
| | | | | 15/250.32 |
| 3,254,358 A * | 6/1966 | Wise | ............... | B60S 1/4003 |
| | | | | 15/250.32 |
| 4,970,751 A * | 11/1990 | Fisher | ............... | B60S 1/40 |
| | | | | 15/250.32 |
| 4,980,944 A * | 1/1991 | Longman | ............... | B60S 1/40 |
| | | | | 15/250.32 |
| 6,782,581 B2 * | 8/2004 | Block | ............... | B60S 1/38 |
| | | | | 15/250.32 |
| 7,690,073 B2 * | 4/2010 | Marmoy | ............... | B60S 1/3856 |
| | | | | 15/250.32 |
| 8,528,156 B2 * | 9/2013 | Umeno | ............... | B60S 1/381 |
| | | | | 15/250.361 |
| 2009/0151110 A1 | 6/2009 | Ku | | |
| 2009/0199357 A1 * | 8/2009 | Thienard | ............... | B60S 1/3853 |
| | | | | 15/250.32 |
| 2010/0186185 A1 * | 7/2010 | Grasso | ............... | B60S 1/387 |
| | | | | 15/250.32 |
| 2011/0277266 A1 * | 11/2011 | Umeno | ............... | B60S 1/381 |
| | | | | 15/250.32 |
| 2012/0180247 A1 * | 7/2012 | Ku | ............... | B60S 1/3853 |
| | | | | 15/250.32 |

FOREIGN PATENT DOCUMENTS

| | | |
|---|---|---|
| DE | 10122764 A1 * | 2/2003 |
| DE | 102009014700 | 10/2009 |
| EP | 2080680 | 7/2009 |
| FR | 2924080 | 5/2009 |
| KR | 20100023942 | 3/2010 |
| WO | WO2004/041606 A1 * | 5/2004 |

* cited by examiner

WIPER BLADE DEVICE

BACKGROUND OF THE INVENTION

The invention is based on a wiper blade device.

FR 2 924 080 A1 discloses a wiper blade device with a base unit and an adapter unit which is connectable to a wiper arm. The base unit is designed as a receptacle which is open on two sides, with a latching element on one open side of the receptacle, and is provided to fix the adapter unit in a form-fitting manner. In a mounted state, the base unit is fixedly connected to a spring strip.

SUMMARY OF THE INVENTION

The invention is based on a wiper blade device with a base unit and an adapter unit which is connectable to a wiper arm and, in at least one mounted state, is fixed in a form-fitting manner to the base unit.

It is proposed that the wiper blade device has at least one form-fitting recess which extends at least from a first side surface to a second side surface of the base unit or of the adapter unit. The first side surface and the second side surface are preferably formed differently from each other. A "base unit" in this context is to be understood as meaning, in particular, a unit which provides a base for the adapter unit and which is fastened, in particular in at least one mounted state, to a spring strip. A "spring strip" in this context is to be understood as meaning, in particular, an element which has at least one extent which, in a normal operating state, is elastically changeable by at least 10%, in particular by at least 20%, preferably by at least 30%, and particularly advantageously by at least 50%, and which in particular produces a counterforce which is dependent on a change in the extent and which counteracts the change. An "extent" of an element in this context is to be understood as meaning, in particular, a maximum distance between two points of a perpendicular projection of the element onto a plane. The spring strip is preferably partially, preferably at least largely and, particularly advantageously, completely composed of spring steel. The fact that the spring strip is "at least largely" composed of spring steel is intended to be understood as meaning, in particular, that the spring strip with a mass portion of at least 50%, in particular of at least 70%, preferably of at least 90% and, particularly advantageously, of at least 95% is composed of spring steel. The base unit is preferably formed integrally. "Integrally" is to be understood as meaning, in particular, at least integrally bonded, for example by a welding process, an adhesive bonding process, an injection-molding process and/or another process appearing expedient to a person skilled in the art, and/or, advantageously, as meaning formed in one piece, such as, for example, through production by casting and/or production in a single or multi-component injection-molding process and advantageously from an individual blank.

An "adapter unit" in this context is to be understood as meaning, in particular, a unit which has a contact region with a wiper blade component, in particular the base unit, and in particular, in at least one mounted state, is connected captively to the wiper blade component and is provided for providing a coupling region of a wiper blade for coupling and/or contact connection with the wiper arm, in particular a wiper arm adapter of the wiper arm. "Provided" is to be understood as meaning, in particular, specially designed and/or equipped. The adapter unit is preferably connected rotatably to the wiper arm, in particular to the wiper arm adapter of the wiper arm, in particular also indirectly via at least one bearing element. The base unit and/or the adapter unit are preferably at least substantially composed of metal and/or plastic. The fact that the base unit and/or the adapter unit "are at least substantially composed of metal and/or plastic" is intended to be understood as meaning, in particular, that the base unit and/or the adapter unit are composed of metal and/or plastic with a mass portion of at least 60%, in particular of at least 70%, preferably of at least 80% and, particularly advantageously, of at least 90%. The adapter unit is preferably formed integrally. The fact that the adapter unit in the mounted state is "fixed in a form-fitting manner to the base unit" is intended to be understood as meaning, in particular, that a center of gravity spacing and/or angular orientation of the adapter unit with respect to the base unit in the mounted state by means of a form-fitting connection are at least substantially constant. The fact that the center of gravity spacing and/or the angular orientation are "at least substantially constant" is intended to be understood as meaning, in particular, that a maximum possible relative change in the center of gravity spacing and/or the angular orientation in the mounted state is at most 15%, in particular at maximum 10%, preferably at most 5% and, particularly advantageously, at maximum 1%. A "form-fitting recess" in this context is to be understood as meaning, in particular, a recess which provides at least one form-fitting element. A "recess" is intended to be understood as meaning, in particular, a material recess in a constructional unit, which material recess extends in particular from a first surface of the constructional unit, in particular the first side surface, to a preferably opposite, second surface of the constructional unit, in particular the second side surface. The recess is designed in particular as an edge recess.

A "form-fitting element" is intended to be understood as meaning, in particular, an element which, in at least one mounted state, enters into a form-fitting connection with a further form-fitting element. A "side surface" is intended to be understood as meaning, in particular, a preferably smooth surface which, in particular, is bounded by edges, in particular even by slightly rounded edges, and which is at least substantially perpendicular to a main plane of extent of the base unit and/or the adapter unit. In this connection, an "edge" is intended to be understood as meaning, in particular, a surface region which has a radius of curvature of at most 3 mm, in particular of at maximum 2 mm, preferably of at most 1 mm and, particularly advantageously, of at maximum 0.5 mm. A "main plane of extent" of a constructional unit is to be understood as meaning, in particular, a plane which is parallel to a largest side surface of a smallest geometrical cuboid which the constructional unit just still completely encloses and in particular runs through the center point of said cuboid. The fact that the side surface is "at least substantially perpendicular" to the main plane of extent of the base unit or of the adapter unit is intended to be understood as meaning, in particular, that, for normals of surface elements of the side surface that, taken together, make up at least 60%, in particular at least 70%, preferably at least 80% and, particularly advantageously, at least 90% of an entire area of the side surface, the normals each enclose an angle with a normal of the main plane of extent, which angle deviates at most by 5°, in particular by maximum 3° and preferably by at most 1° from a right angle. The side surfaces are preferably outer side surfaces of the base unit or of the adapter unit. The fact that the form-fitting recess "extends" from a first side surface to a second side surface is to be understood as meaning, in particular, that at least one edge bounding the first side surface and at least one edge bounding the second side surface are at the same time the form-fitting recess and in particular edges bounding the end region of said form-fitting recess.

By means of such a configuration, advantageously simple mountability can be achieved, since the adapter unit can be mounted onto the base unit from both side surfaces.

Furthermore, it is proposed that the first side surface and the second side surface are spaced apart from each other. The fact that the first side surface and the second side surface are "spaced apart from each other" is to be understood as meaning, in particular, that the first side surface and the second side surface are free from common edges bounding the side surfaces. The two side surfaces are preferably arranged opposite each other. The fact that the two side surfaces are "arranged opposite each other" is to be understood as meaning, in particular, that, for each of the two side surfaces, there is at least one normal which simultaneously intersects the two side surfaces at at least one point in each case. The two side surfaces are preferably arranged at least substantially parallel to each other. The fact that the two side surfaces are arranged "at least substantially parallel to each other" is to be understood as meaning, in particular, that the first side surface can be reproduced by simple parallel displacement and/or by a specular reflection in one plane onto the second side surface. By this means, mountability can be particularly advantageously simplified.

The wiper blade device advantageously comprises at least one spring strip to which the base unit is at least substantially fixedly connected in at least one mounted state. The base unit can be fixedly connected to the spring strip in any manner appearing expedient to a person skilled in the art, for example by a form-fitting connection, in particular a latching connection, and/or an integrally bonded connection, in particular welding, preferably ultrasonic welding, and/or soldering and/or adhesive bonding. This makes it possible to provide an advantageously simple wiper blade needing particularly little construction space.

In a preferred refinement of the invention, it is proposed that at least one of the two side surfaces is arranged at least substantially parallel to a longitudinal direction of the spring strip. The two side surfaces are preferably arranged at least substantially parallel to a longitudinal direction of the spring strip. A "longitudinal direction" of a unit in this context is to be understood as meaning, in particular, a direction which is arranged parallel to a longest edge of a smallest geometrical cuboid which just still completely encloses the unit. The fact that the side surface is "arranged at least substantially parallel to a longitudinal direction of the spring strip" is to be understood as meaning, in particular, that, for normals of surface elements of the side surface that, taken together, make up at least 60%, in particular at least 70%, preferably at least 80% and, particularly advantageously, at least 90% of an entire area of the side surface, the normals and the longitudinal direction of the spring strip enclose an angle which deviates at most by 5°, in particular by a maximum of 3° and preferably by at most 1° from a right angle. By this means, mounting can be particularly advantageously simplified since, in particular, good accessibility can be achieved.

In a particularly preferred refinement of the invention, it is proposed that the form-fitting recess is of at least substantially channel-shaped design. The fact that the form-fitting recess is "of at least substantially channel-shaped design" is to be understood as meaning, in particular, that the form-fitting recess in an imaginary, straightened state has a longitudinal extent which is at least 1.5 times, in particular at least 2 times, preferably at least 3 times and, particularly advantageously, at least 4 times the size of at least one transverse extent perpendicular to the longitudinal extent. The at least substantially channel-shaped form-fitting recess advantageously extends at least substantially parallel to the main plane of extent of the base unit and/or of the adapter unit. This makes it possible to achieve an advantageously stable connection between the adapter unit and the base unit. In particular, mounting can be further simplified. The form-fitting recess is preferably at least substantially designed as a dovetail guide. The fact that the form-fitting recess is "at least substantially designed as a dovetail guide" is to be understood as meaning, in particular, that at least 60%, in particular at least 70%, preferably at least 80% and, particularly advantageously, at least 90% of all of the cross sections of the form-fitting recess are present in the form of a preferably mirror-symmetrical trapezoid with the shortest base side missing. All of said trapezoids are preferably identical to one another. By this means, particularly advantageous stability of the connection between the adapter unit and the base unit can be achieved. In particular, a play occurring in the mounted state between the adapter unit and the base unit can be reduced.

Furthermore, it is proposed that the form-fitting recess is arranged on the base unit in at least one mounted state. The form-fitting recess is preferably designed as a recess in the preferably integral base unit. A form-fitting element corresponding to the form-fitting recess is then preferably arranged on the adapter unit. The form-fitting element is preferably formed integrally on the adapter unit. By this means, a construction can be simplified and a multiplicity of components reduced.

The wiper blade device advantageously comprises a holding unit which, in at least one mounted state, at least partially fixes the adapter unit relative to the base unit in at least one direction at least substantially perpendicular to at least one of the side surfaces. In the mounted state, the holding unit preferably at least partially fixes the adapter unit relative to the base unit in the two directions which are at least substantially perpendicular to at least one of the side surfaces. The holding unit can comprise at least one arbitrary holding element appearing expedient to a person skilled in the art, but in particular at least one form-fitting element. In this context, a "direction at least substantially perpendicular to at least one of the side surfaces" is to be understood as meaning, in particular, a direction for which normals of surface elements of the side surface that, taken together, make up at least 60%, in particular at least 70%, preferably at least 80% and, particularly advantageously, at least 90% of an entire area of the side surface enclose, with the direction, a smallest angle which is at most 15°, in particular at maximum 10°, preferably at most 5° and particularly advantageously at maximum 1°. By this means, a reliable fixing of the adapter unit to the base unit can be achieved.

If the holding unit has at least one latching element, mounting of the adapter unit on the base unit can advantageously be simplified. The holding unit preferably comprises at least two latching elements, in particular at least one latching element for each of the two side surfaces, as a result of which the mounting can be particularly advantageously simplified. In this context, a "latching element" is to be understood as meaning, in particular, an element which is provided for producing a latching connection in interaction with a further latching element. The latching element is preferably designed as a latching hook which, in particular, has a partial region which, in the event of a latching operation, is moved in at least one direction, in particular a direction perpendicular to the spring strip, and/or changes an extent in at least one direction, in particular a direction perpendicular to the spring strip.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
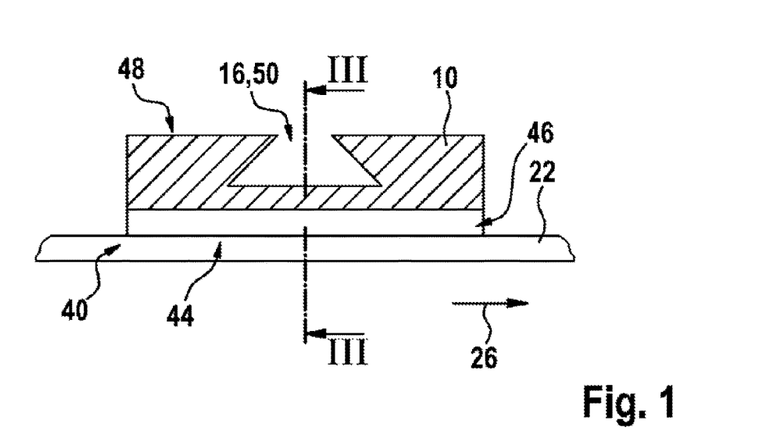
FIG. 1 shows part of a wiper blade device with two spring strips and a base unit fastened to the spring strips, in a sectional illustration.
Figure 2:
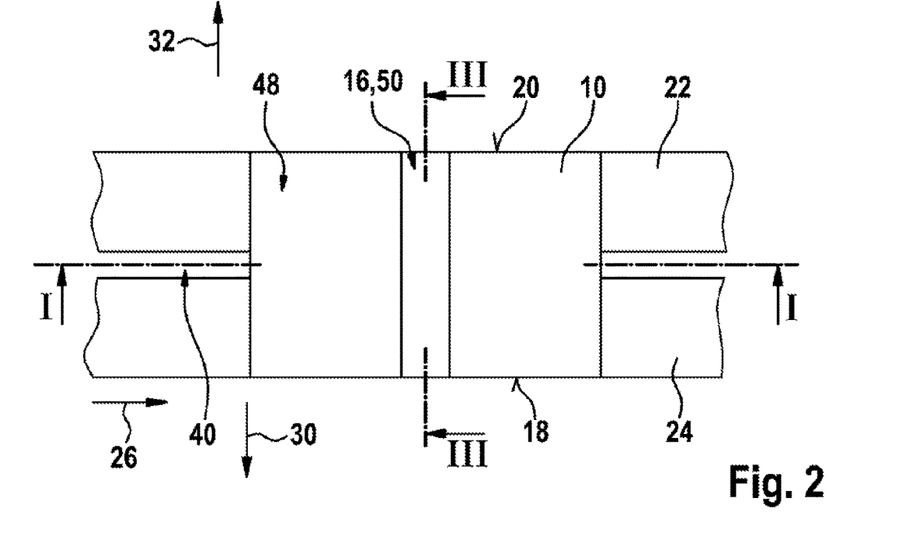
FIG. 2 shows the part of the wiper blade device in a plan view of a form-fitting recess of the wiper blade device.
Figure 3:
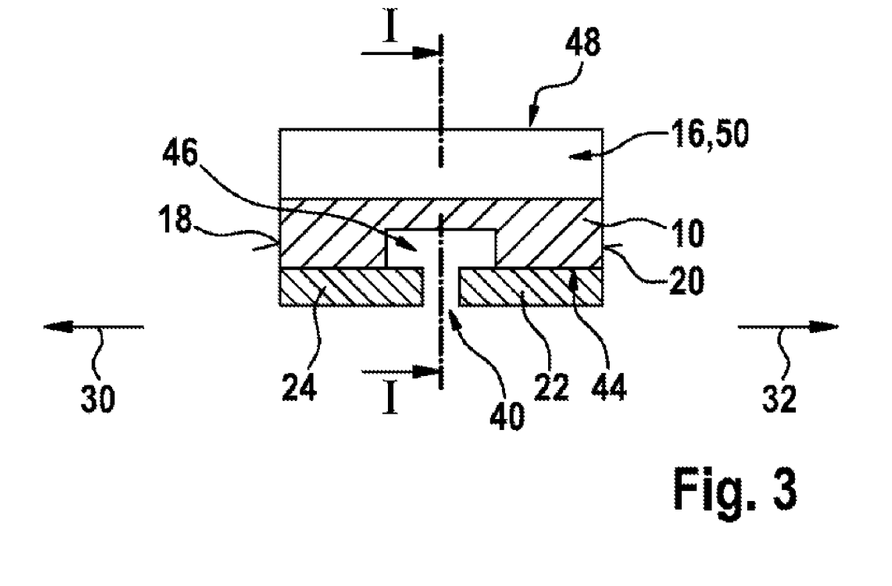
FIG. 3 shows the part of the wiper blade device in a further sectional illustration.

FIG. 1 shows part of a wiper blade device in a sectional illustration along a line II in FIG. 2 and a line II in FIG. 3. FIG. 2 shows the part of the wiper blade device in a plan view from above. FIG. 3 shows the part of the wiper blade device in a further sectional illustration along a line III-III in FIG. 1 and a line III-III in FIG. 2. The wiper blade device comprises two spring strips 22, 24 and a base unit 10. The spring strips 22, 24 are composed of spring steel. In a mounted state, the spring strips 22, 24 are arranged parallel to and spaced apart from each other. A receiving region 40 for a wiper strip 42 of a wiper blade 38 is provided between the spring strips 22, 24 (cf. FIG. 8). In the mounted state, the base unit 10 is fastened to the spring strips 22, 24. The base unit 10 is of integral design. The base unit 10 is composed of metal. In the mounted state, the base unit 10 is connected to the spring strips 22, 24 by means of a weld. In a region above the receiving region 40, the base unit 10 has, on a lower side 44 facing the spring strips 22, 24 in the mounted state, a recess 46 which is provided for receiving part of the wiper strip 42 (cf. FIG. 8). On an upper side 48 opposite the lower side 44, the base unit 10 has a form-fitting recess 16. The form-fitting recess 16 extends from a first side surface 18 of the base unit 10 to a second side surface 20 of the base unit 10. The side surfaces 18, 20 are flat, outer surfaces of the base unit 10. The side surfaces 18, 20 are arranged spaced apart from each other and parallel to each other. The side surfaces 18, 20 are arranged between the upper side 48 and the lower side 44 of the base unit 10. The side surfaces 18, 20 are arranged parallel to a longitudinal direction 26 of the spring strips 22, 24. The form-fitting recess 16 is of at least substantially channel-shaped design. The form-fitting recess 16 is arranged rectilinearly between the side surfaces 18, 20. The form-fitting recess 16 is designed as a dovetail guide 50.

Figure 4:
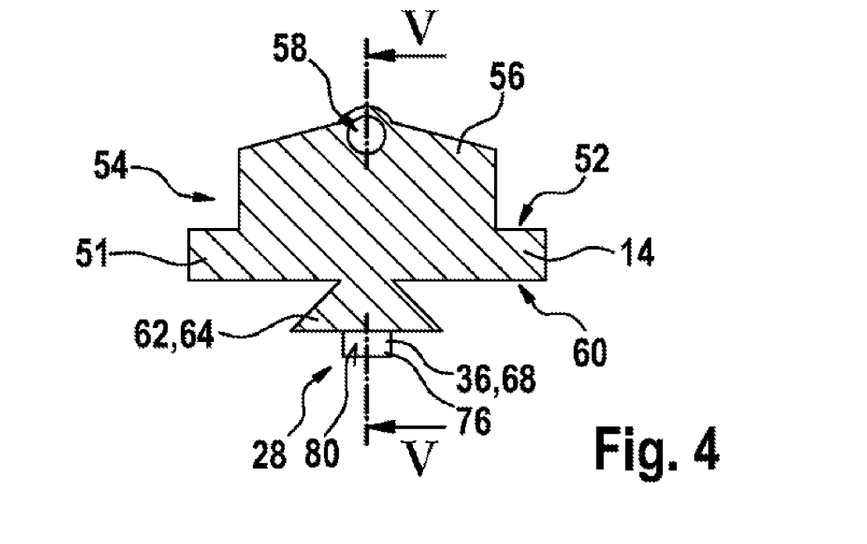
FIG. 4 shows an adapter unit of the wiper blade device in a sectional illustration.
Figure 5:
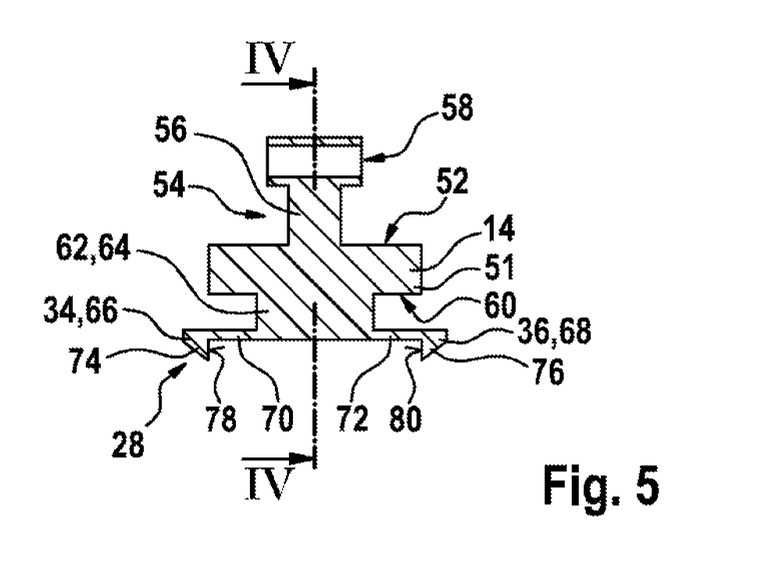
FIG. 5 shows the adapter unit in a further sectional illustration.
Figure 6:
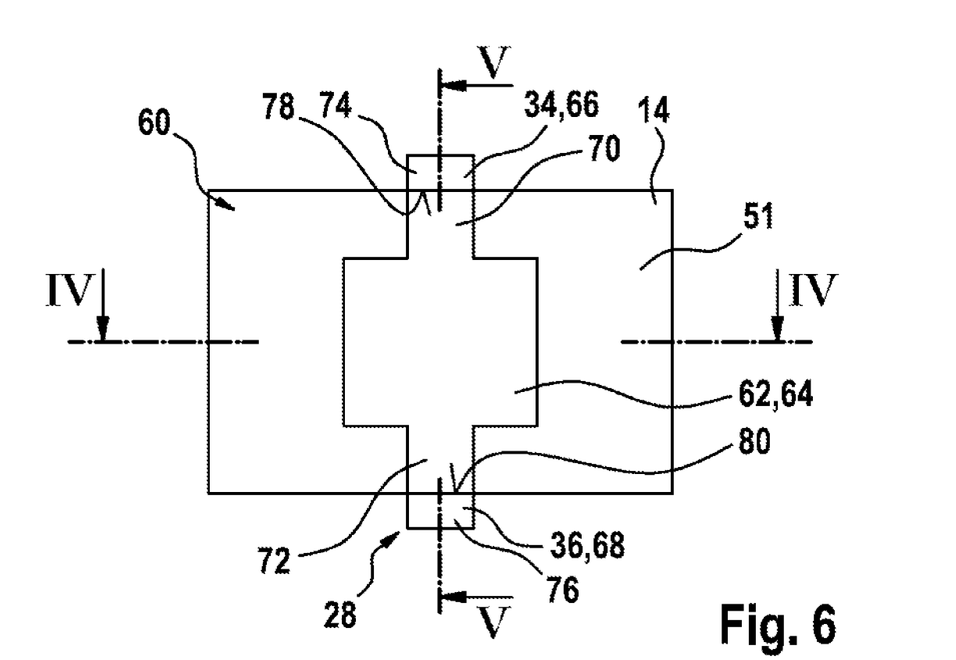
FIG. 6 shows the adapter unit in a plan view of a form-fitting element corresponding to the form-fitting recess.

FIG. 4 shows an adapter unit 14 of the wiper blade device in a sectional illustration along a line IV-IV in FIG. 5 and a line IV-IV in FIG. 6. FIG. 5 shows the adapter unit 14 in a further sectional illustration along a line V-V in FIG. 4 and a line V-V in FIG. 6. FIG. 6 shows the adapter unit 14 in a plan view from below. The adapter unit 14 is of integral design. The adapter unit 14 is composed of plastic. The adapter unit 14 has a carrier plate 51. On an upper side 52 of the carrier plate 51, the adapter unit 14 has a bearing region 54 for rotatable connection to a wiper arm 12 (cf. schematic illustration in FIG. 8). The adapter unit 14 has, in the bearing region 54, a bearing web 56 and, on the outer end thereof, a bearing opening 58. The bearing opening 58 together with a bearing element of the wiper arm 12 forms a rotary bearing (not illustrated). On a lower side 60 of the carrier plate 51 opposite the upper side 52, the adapter unit 14 comprises a form-fitting element 62. The form-fitting element 62 is designed so as to correspond to the form-fitting recess 16. The form-fitting element 62 is designed as a dovetail 64. As viewed along in each case an axis of symmetry, the form-fitting element 62 is designed to be shorter than the form-fitting recess 16. The adapter unit 14 comprises a holding unit 28 which, in the mounted state, fixes the adapter unit 14 relative to the base unit 10 in the two directions 30, 32 perpendicular to the side surfaces 18, 20 (cf. FIG. 8). For this purpose, the holding unit 28 comprises two latching elements 34, 36. The latching elements 34, 36 are designed as latching hooks 66, 68. The latching elements 34, 36 are molded onto the form-fitting element 62. The latching hooks 66, 68 respectively have a spring web 70, 72 and a latching lug 74, 76 adjoining the latter. The latching lugs 74, 76 have a material thickness increasing from the outside inward. The latching lugs 74, 76 each have a run-on slope which is directed away and outward from the lower side 60. The latching lugs 74, 76 respectively have a holding surface 78, 80 directed toward the form-fitting element 62. The holding surfaces 78, 80 are oriented perpendicularly to the lower side 60 of the carrier plate 51 of the adapter unit 14. The holding surfaces 78, 80 are at a distance which corresponds to a distance of the first side surface 18 from the second side surface 20 (cf. FIG. 8). The latching elements 34, 36 are each arranged with the spring webs 70, 72 thereof at a lower end of the form-fitting element 62, which end faces away from the lower side 60. The latching elements 34, 36 are arranged along a mirror plane of symmetry of the form-fitting element 62 on both sides of the form-fitting element 62.

Figure 7:
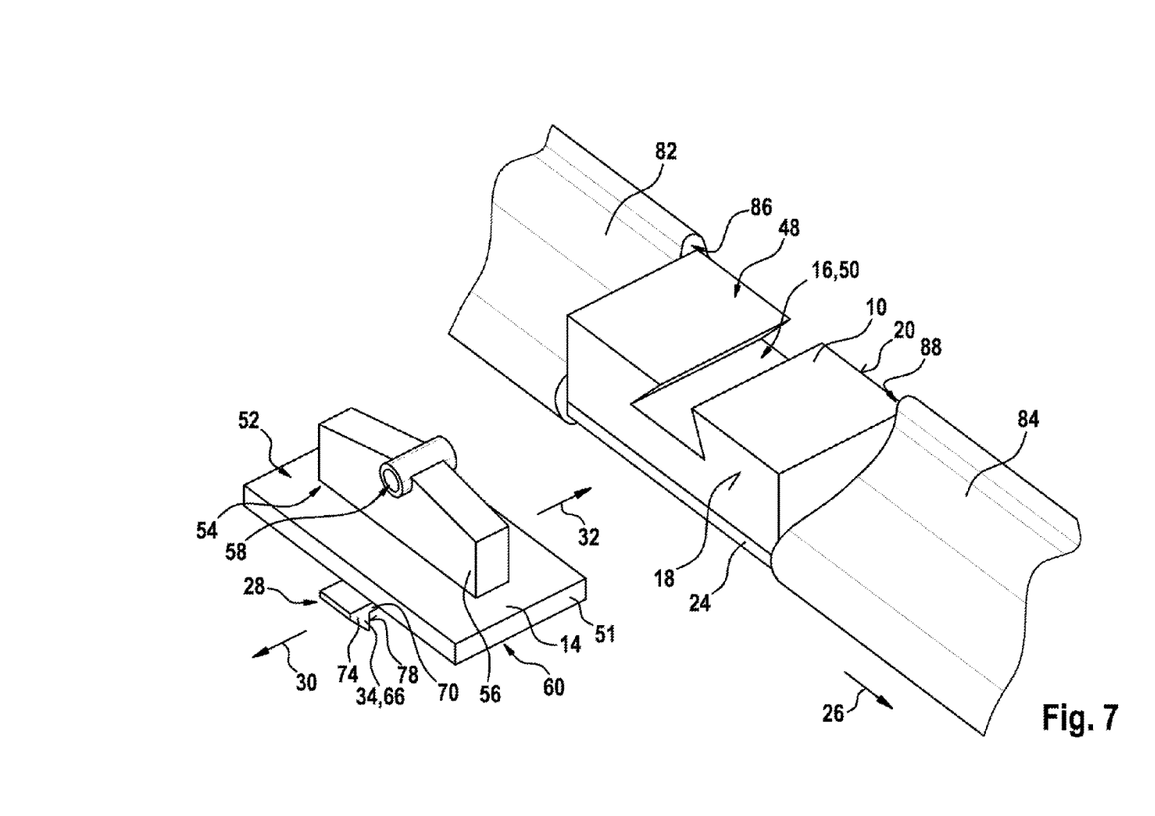
FIG. 7 shows a mounting step of the adapter unit on the base unit.

FIG. 7 shows a mounting step of the adapter unit 14 onto the base unit 10. When the adapter unit 14 is mounted onto the base unit 10, the form-fitting element 62 of the adapter unit 14 is introduced into the form-fitting recess 16 of the base unit 10 either in the direction 30 or in the direction 32. For this purpose, the spring web 70, 72 of the respective latching element 34, 36 first of all has to be deformed in the direction of the lower side 60 of the carrier plate 51 of the adapter unit 14. As soon as the form-fitting element 62 is pushed centrally into the form-fitting recess 16, the respective latching element 34, 36 latches on the respective side surface 18, 20 of the base unit 10 (cf. FIG. 8). FIG. 7 furthermore shows two spoiler elements 82, 84 of the wiper blade 38. In the mounted state, the spoiler elements 82, 84 are pushed on both sides onto the spring strips 22, 24 and bear with a respective end side 86, 88 against the base unit 10. For the sake of clarity, the wiper strip 42 is not illustrated in FIG. 7.

Figure 8:
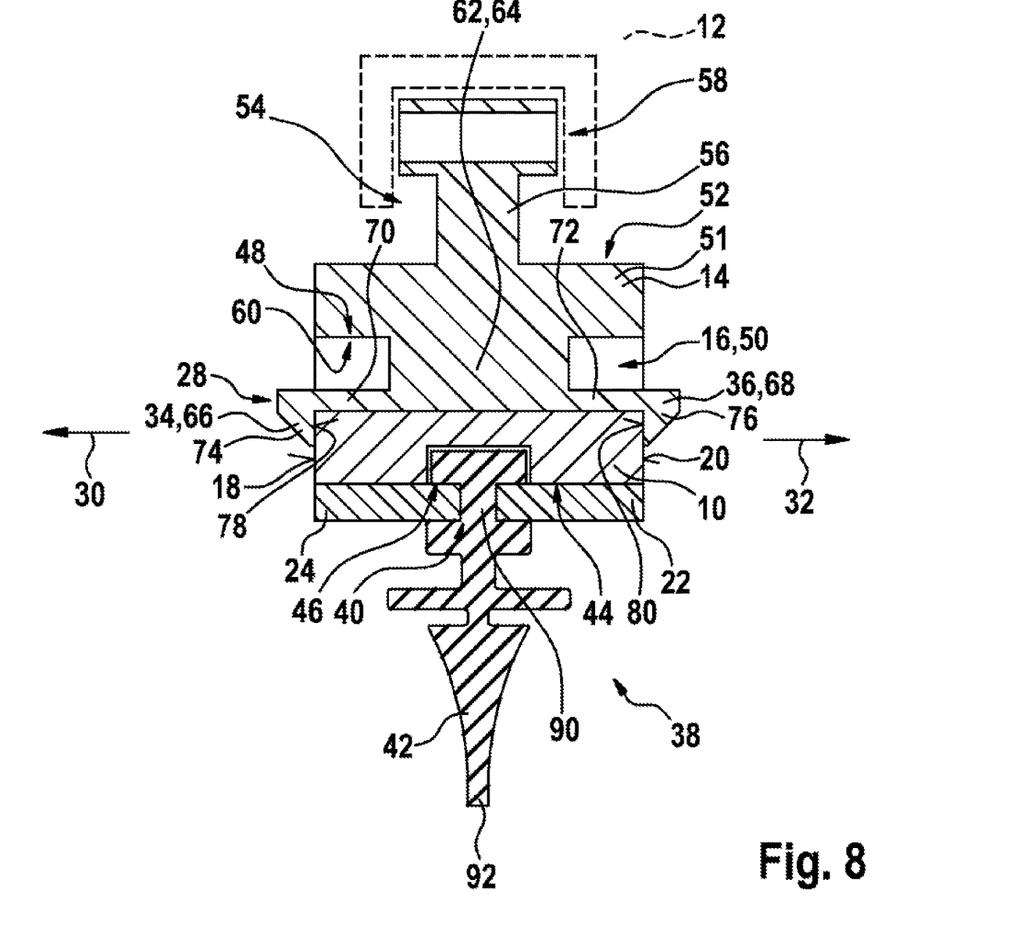
FIG. 8 shows a wiper blade with the wiper blade device in a sectional illustration.

FIG. 8 shows the mounted wiper blade 38 with the wiper blade device in a sectional illustration which corresponds to the sectional illustrations of FIGS. 3 and 5. In the mounted state, the holding surfaces 78, 80 of the latching elements 34, 36 of the adapter unit 14 bear against the side surfaces 18, 20 of the base unit 10. The adapter unit 14 which is connectable to the wiper arm 12 is fixed in a form-fitting manner to the base unit 10. The wiper strip 42 has a holding element 90 which is at least substantially H-shaped, as viewed in a cross section, and which extends parallel to a wiper lip 92 of the wiper strip 42. In the mounted state, a central web of the holding element 90 is arranged in the receiving region 40 between the spring strips 22, 24. The holding element 90 at least partially engages around the spring strips 22, 24. In the mounted state, an H-limb of the holding element 90 is arranged in the recess 46 of the base unit 10.

In alternative refinements, it is also conceivable for a form-fitting recess to be arranged on an adapter unit and a corresponding form-fitting element to be arranged on a base unit. Furthermore, a deviation from a dovetail shape is conceivable. Furthermore, any holding unit appearing expedient to a person skilled in the art is conceivable. For example, latching elements of a holding unit can also be arranged on a base unit instead of on an adapter unit. Furthermore, a different refinement from a refinement described here of a bearing region of an adapter unit can be conceivable if the adapter unit is provided for connection to an alternative wiper arm. Therefore, different adapter units which differ in the bearing regions thereof can be provided in particular for different types of wiper arms, in particular for different types of wiper arm adapters of the wiper arms.

What is claimed is:

1. A wiper blade device with a base unit (10) and an adapter unit (14) which is connectable to a wiper arm (12) and, in at least one mounted state, is fixed in a form-fitting manner to the base unit (10), characterized by at least one form-fitting recess (16) which extends at least from a first side surface (18) to a second side surface (20) of the base unit (10) or of the adapter unit (14), wherein the first and second side surfaces (18, 20) are outer surfaces of the base unit (10) or the adapter unit (14), wherein the first and second side surfaces (18, 20) are spaced apart from one another and face away from one another, wherein the form-fitting recess (16) is openly exposed along a surface (48) of the base unit (10) or the adapter unit (14) that extends between the first and second side surfaces (18, 20), wherein the form-fitting recess (16) receives a form-fitting element (62, 64) on the base unit (10) or the adapter unit (14), wherein the form-fitting element (62, 64) is sized and shaped so as to slide into the form-fitting recess (16) along a first direction (30, 32) that extends between the first and second side surfaces (18, 20), such that immediately once the form-fitting element (62, 64) has been slid into the form-fitting recess, the form-fitting element (62, 64) is restrained by interior surfaces of the base unit (10) or of the adapter unit (14) from moving in any direction along a vertical axis that is perpendicular to both the first direction and to a longitudinal direction of the wiper blade device, and wherein the form-fitting recess is a blind recess having a trapezoidal cross-sectional shape, such that the blind recess expands in width moving inwardly from an outer surface of the base unit (10) or the adapter unit (14).

2. The wiper blade device as claimed in claim 1, characterized by at least one spring strip (22, 24) to which the base unit (10) is at least substantially fixedly connected in at least one mounted state.

3. The wiper blade device as claimed in claim 2, characterized in that at least one of the two side surface (18, 20) is arranged at least substantially parallel to a longitudinal direction (26) of the spring strip (22, 24).

4. The wiper blade device as claimed in claim 2, wherein the at least one spring strip (22, 24) is welded to the base unit (10).

5. The wiper blade device as claimed in claim 1, characterized in that the form-fitting recess (16) is of at least substantially channel-shaped design.

6. The wiper blade device as claimed in claim 1, characterized in that the form-fitting recess (16) is arranged on the base unit (10) in at least one mounted state.

7. The wiper blade device as claimed in claim 1, characterized by a holding unit (28) which, in at least one mounted state, at least partially fixes the adapter unit (14) relative to the base unit (10).

8. The wiper blade device as claimed in claim 7, characterized in that the holding unit (28) has at least one latching element (34, 36) that extends from the form-fitting element (62, 64) and contacts one of the first and second side surfaces (18, 20).

9. A wiper blade (38) with a wiper blade device as claimed in claim 1.

10. The wiper blade device as claimed in claim 1, characterized by at least one spring strip (22, 24) to which the base unit (10) is at least substantially fixedly connected in at least one mounted state.

11. The wiper blade device as claimed in claim 10, characterized in that at least one of the two side surface (18, 20) is arranged at least substantially parallel to the longitudinal direction (26) of the spring strip (22, 24).

12. The wiper blade device as claimed in claim 11, characterized in that the form-fitting recess (16) is of at least substantially channel-shaped design.

13. The wiper blade device as claimed in claim 12, characterized in that the form-fitting recess (16) is arranged on the base unit (10) in at least one mounted state.

14. The wiper blade device as claimed in claim 13, characterized by a holding unit (28) which, in at least one mounted state, at least partially fixes the adapter unit (14) relative to the base unit (10).

15. The wiper blade device as claimed in claim 14 characterized in that the holding unit (28) has at least one latching element (34, 36) that extends from the form-fitting element (62, 64) and contacts one of the first and second side surfaces (18, 20).

16. The wiper blade device as claimed in claim 10, wherein the at least one spring strip (22, 24) is welded to the base unit (10).

17. The wiper blade device as claimed in claim 1, wherein the at least one form-fitting recess (16) is in the base unit (10) and has a trapezoidal cross-sectional shape with a first width along the longitudinal direction at the surface (48) of the base unit (10) that is smaller than a second width along the longitudinal direction at a position spaced from the surface (48) of the base unit (10), wherein the form-fitting element (62, 64) is a projection of the adapter unit (14), the projection having a trapezoidal cross-sectional shape and configured to slide into the at least one form-fitting recess (16) along the first direction (30, 32), and wherein the interior surfaces are surfaces of the base unit (10) that angle toward one another to restrain the form-fitting element (62, 64) from moving along the vertical direction.

18. The wiper blade device as claimed in claim 1, wherein the at least one form-fitting recess (16) is positioned centrally in the base unit (10) or the adapter unit (14) along the longitudinal direction (26).

19. The wiper blade device as claimed in claim 1, wherein the first direction (30, 32) is perpendicular to both the first and second side surfaces (18, 20).

20. The wiper blade device as claimed in claim 1, further comprising a wiper strip (42) coupled to the base unit (10), the wiper strip (42) having a wiper lip (92), wherein the vertical axis extends through the adapter unit (14), the base unit (10), and the wiper lip (92).

21. The wiper blade device as claimed in claim 1, wherein the form-fitting element has a trapezoidal cross-sectional shape and extends as a protrusion from the base unit (10) or the adapter unit (14).

22. A wiper blade device with a base unit (10) and an adapter unit (14) which is connectable to a wiper arm (12) and, in at least one mounted state, is fixed in a form-fitting manner to the base unit (10), characterized by at least one form-fitting recess (16) which extends at least from a first side surface (18) to a second side surface (20) of the base unit (10) or of the adapter unit (14), wherein the first and second side surfaces (18, 20) are outer surfaces of the base unit (10) or the adapter unit (14), wherein the first and second side surfaces (18, 20) are spaced apart from one another and face away from one another, wherein the form-fitting recess (16) is openly exposed along a surface (48) of the base unit (10) or the adapter unit (14) that extends between the first and second side surfaces (18, 20), wherein the form-fitting recess (16) receives a form-fitting element (62, 64) on the base unit (10) or the adapter unit (14), wherein the form-fitting element (62, 64) is sized and shaped so as to slide into the form-fitting recess (16) along a first direction (30, 32) that extends between the first and second side surfaces (18, 20), such that immediately once the form-fitting element (62, 64) has been slid into the form-fitting recess, the form-fitting element (62, 64) is restrained by interior surfaces of the base unit (10) or of the adapter unit (14) from moving in any direction along a vertical axis that is perpendicular to both the first direction and to a longitudinal direction of the wiper blade device, wherein the wiper blade device further includes a holding unit (28) which, in at least one mounted state, at least partially fixes the adapter unit (14) relative to the base unit (10), and wherein the holding unit (28) has at least one latching element (34, 36) that extends from the form-fitting element (62, 64) and contacts one of the first and second side surfaces (18, 20).

23. A wiper blade device with a base unit (10) and an adapter unit (14) which is connectable to a wiper arm (12) and, in at least one mounted state, is fixed in a form-fitting manner to the base unit (10), characterized by at least one form-fitting recess (16) which extends at least from a first side surface (18) to a second side surface (20) of the base unit (10) or of the adapter unit (14), wherein the first and second side surfaces (18, 20) are outer surfaces of the base unit (10) or the adapter unit (14), wherein the first and second side surfaces (18, 20) are spaced apart from one another and face away from one another, wherein the form-fitting recess (16) is openly exposed along a surface (48) of the base unit (10) or the adapter unit (14) that extends between the first and second side surfaces (18, 20), wherein the form-fitting recess (16) receives a form-fitting element (62, 64) on the base unit (10) or the adapter unit (14), wherein the form-fitting element (62, 64) is sized and shaped so as to slide into the form-fitting recess (16) along a first direction (30, 32) that extends between the first and second side surfaces (18, 20), such that immediately once the form-fitting element (62, 64) has been slid into the form-fitting recess, the form-fitting element (62, 64) is restrained by interior surfaces of the base unit (10) or of the adapter unit (14) from moving in any direction along a vertical axis that is perpendicular to both the first direction and to a longitudinal direction of the wiper blade device, wherein the at least one form-fitting recess (16) is in the base unit (10) and has a trapezoidal cross-sectional shape with a first width along the longitudinal direction at the surface (48) of the base unit (10) that is smaller than a second width along the longitudinal direction at a position spaced from the surface (48) of the base unit (10), wherein the form-fitting element (62, 64) is a projection of the adapter unit (14), the projection having a trapezoidal cross-sectional shape and configured to slide into the at least one form-fitting recess (16) along the first direction (30, 32), and wherein the interior surfaces are surfaces of the base unit (10) that angle toward one another to restrain the form-fitting element (62, 64) from moving along the vertical direction.

* * * * *